US011866990B2

(12) United States Patent
Greening et al.

(10) Patent No.: US 11,866,990 B2
(45) Date of Patent: Jan. 9, 2024

(54) CORNER BRACKET

(71) Applicant: Louver-Lite Limited, Hyde (GB)

(72) Inventors: Andrew Greening, Hyde (GB); Antony Barnes, Hyde (GB)

(73) Assignee: LOUVER-LITE LIMITED, Cheshire (GB)

( * ) Notice: Subject to any disclaimer, the term of this patent is extended or adjusted under 35 U.S.C. 154(b) by 133 days.

(21) Appl. No.: 17/292,892

(22) PCT Filed: Nov. 11, 2019

(86) PCT No.: PCT/EP2019/080906
§ 371 (c)(1),
(2) Date: May 11, 2021

(87) PCT Pub. No.: WO2020/099343
PCT Pub. Date: May 22, 2020

(65) Prior Publication Data
US 2021/0404244 A1 Dec. 30, 2021

(30) Foreign Application Priority Data
Nov. 12, 2018 (GB) ..................................... 1818419

(51) Int. Cl.
*E06B 3/96* (2006.01)
*E06B 3/968* (2006.01)
(Continued)

(52) U.S. Cl.
CPC .......... *E06B 3/9685* (2013.01); *E06B 3/9765* (2013.01); *E06B 9/264* (2013.01); *E06B 9/266* (2013.01); *E06B 9/42* (2013.01)

(58) Field of Classification Search
CPC ...... E06B 3/9685; E06B 3/9765; E06B 9/264; E06B 9/266; E06B 9/42; E06B 3/968; E06B 3/9681; E06B 3/96; E06B 3/9687
See application file for complete search history.

(56) References Cited

U.S. PATENT DOCUMENTS 3,546,842 A * 12/1970 Blum ........................ E04B 9/12
52/656.1
3,686,795 A * 8/1972 La Barge .................. E06B 7/12
49/504

(Continued)

FOREIGN PATENT DOCUMENTS

| | | | | |
|---|---|---|---|---|
| CA | 2458913 A1 * | 8/2005 | ............... | E06B 9/54 |
| WO | 2006109009 | 10/2006 | | |
| WO | 2018055416 | 3/2018 | | |

OTHER PUBLICATIONS

International Search Report and Written Opinion dated Feb. 19, 2020 in International Patent Application No. PCT/EP2019/080906.

*Primary Examiner* — Beth A Stephan
(74) *Attorney, Agent, or Firm* — Billion & Armitage

(57) ABSTRACT

A corner bracket for a window blind frame, the corner bracket including a central body portion and extending from the central body portion a first connector and a second connector, wherein the second connector is angled relative to the first connector; each connector includes a locating arm, a friction plate and a stop surface; wherein each friction plate defines a pair of opposed surfaces and each surface carries thereon a respective outwardly projecting deformable rib; and wherein each locating arm further includes at least one further outwardly projecting deformable rib.

12 Claims, 3 Drawing Sheets

(51) Int. Cl.

| | |
|---|---|
| ***E06B 3/976*** | (2006.01) |
| ***E06B 9/264*** | (2006.01) |
| ***E06B 9/266*** | (2006.01) |
| ***E06B 9/42*** | (2006.01) |

(56) References Cited

U.S. PATENT DOCUMENTS

| | | | | | |
|---|---|---|---|---|---|
| 3,782,054 | A * | 1/1974 | Goss, Jr. | E06B 3/9682 403/295 |
| 3,866,380 | A * | 2/1975 | Benson | E06B 3/667 403/231 |
| 3,889,434 | A * | 6/1975 | Shelver | E06B 3/645 52/204.593 |
| 3,899,258 | A * | 8/1975 | Matthews | E06B 3/9682 52/656.2 |
| 5,547,011 | A * | 8/1996 | Dotson | E06B 9/24 403/402 |
| 8,074,698 | B2 * | 12/2011 | Allsopp | E06B 9/266 160/369 |
| 8,763,342 | B2 * | 7/2014 | Tseng | E06B 3/9644 403/402 |
| 2014/0034588 | A1 * | 2/2014 | Wang | E06B 3/9645 211/41.1 |
| 2019/0127972 | A1 * | 5/2019 | Mackett | E04B 1/86 |
| 2020/0270861 | A1 * | 8/2020 | Bartella | E04B 9/0435 |

* cited by examiner

CORNER BRACKET

FIELD OF THE INVENTION

The present invention relates to corner brackets and, in particular, to corner brackets for window blind frames.

BACKGROUND OF THE INVENTION

It has become quite common for window blinds to be located within window blind frames. WO2006/109009 discloses an example of such a window blind frame. The use of a frame with a window blind provides an aesthetically pleasing arrangement and also addresses the technical problems of minimising light-strike around the sides and bottom of the blind substrate when the substrate is deployed and protecting the side edge portions of the blind substrate in use.

Typically, the frame includes elongate frame members, which form the sides of the frame, and corner brackets which join adjacent ends of the frame members. The elongate frame members are cut to length and the ends are coupled to respective corner brackets via one or more fixings, such as screws.

However, such an arrangement can be time-consuming for the installer, as the screws have to be properly located and each screw tightened individually. The screws also add to the overall cost of the frame.

A frame including "snap-fit" corner brackets is described in WO2018/055416. This document teaches corner brackets that include outwardly projecting locking elements, which snap-fit into corresponding apertures defined by frame members secured to the brackets. It is typically difficult to dis-assemble window blind frames in which the frame members are secured to the corner brackets via snap-fit couplings.

To address these problems, it is desired to produce a "friction-fit" type corner bracket that provides a secure locking arrangement without the need for separate fixings.

SUMMARY OF THE INVENTION

According to a first aspect of the invention, there is provided a corner bracket for a window blind frame, the corner bracket including a central body portion and extending from the central body portion a first connector and a second connector, wherein the second connector is angled relative to the first connector; each connector includes a locating arm, a friction plate and a stop surface; wherein each friction plate defines a pair of opposed surfaces and each surface carries thereon a respective outwardly projecting deformable rib; and wherein each locating arm further includes at least one further outwardly projecting deformable rib.

It has been found that providing the outwardly projecting deformable ribs as defined above, it is not necessary to include additional fixing elements, such as the screws disclosed in WO2006/109009 or the outwardly projecting locking elements (snap-fit connectors) disclosed in WO2018/055416.

According to the invention, the stop surface defines a contact surface against which an end of a frame member may be located. As each of the corner bracket connectors is urged into a receiving portion defined by a respective frame member, each projecting rib is deformed by one or more body and/or wall portions of the frame member and the deformation of each projecting rib forms a friction fit between the corner bracket connector and the frame member which prevents or resists the unintentional dis-engagement of the corner bracket from the frame member.

The frictional forces generated between the corner bracket connector and the frame member are sufficiently high that no further fixings are required.

The angle between the first and second connectors is suitably from 10° to 170°, for example, from 45° to 135°, or from 60° to 120°. The angle may be substantially 90°.

According to an embodiment of the invention, each deformable projecting rib projects in a direction substantially perpendicular to a surface of the bracket which carried the rib. Thus, the deformable projecting ribs of this embodiment may project outwardly from an internally facing surface of each friction plate, outwardly from an externally facing surface of each friction plate and outwardly from a surface of each locating arm. The skilled person will appreciate that a corner bracket has internally facing sides (i.e. those sides which are located proximal to the area defined by the frame and which face towards the area defined within the frame) and externally facing sides (i.e. those sides which are located distal to the area defined by the frame and which face away from the area defined by the frame).

In an embodiment of the invention, each friction plate defines a pair of opposed, substantially planar surfaces (i.e. the internally facing surface and the externally facing surface). Suitably, the respective deformable projecting ribs project in a direction which is perpendicular to the plane of the internally facing surface and/or the externally facing surface.

In order to ensure that a wall of the frame member engages a respective friction plate and the wall is not deformed by the friction plate, each stop surface may include a locating tab, wherein the locating tab is parallel to the respective friction plate and is spaced therefrom. In this embodiment, the locating tab and corresponding friction plate define between them a gap which is suitably sized and configured to receive therein a portion of a frame member wall. The locating tab ensures that a portion of the frame member wall is located adjacent to and in contact with the friction plate. A deformable projecting rib suitably extends from the friction plate into the gap defined between the friction plate and the locating tab.

In order to obtain a desired frictional force, each friction plate may be located in use within a first channel defined between a pair of opposed and spaced apart wall elements carried by the frame member. The or each deformable projecting rib carried by the friction plate is suitably engaged by and deformed by a respective wall element.

In an embodiment of the invention, each friction plate is arranged such that it is parallel to the locating arm of the respective connector. Thus, for example, each locating arm extends outwardly from the central body portion and each corresponding friction plate also extends outwardly from the central body portion in the same direction.

In use, the locating arm is located within a second channel defined by the respective frame member. The locating arm is suitably spaced from the friction plate to accommodate therebetween a portion of a wall which defines the first and/or second channel. The spacing between the locating arm and the friction plate is suitably substantially equal in distance to the width of the wall of the frame member. In such an arrangement, a portion of the frame member wall which defines the first and/or second channel may be located within a gap defined between the locating arm and the friction plate.

According to the invention, each locating arm of the corner bracket includes at least one further deformable projecting rib. For example, a portion of the locating arm which faces the corresponding friction plate may carry the further deformable projecting rib.

Each of the deformable projecting ribs may include a tapered leading edge portion. In such embodiments, the deformation of the projecting ribs increases as the corner bracket connector is inserted into a frame member. Optionally, the entire projecting rib may be tapered.

Each locating arm may include two or more deformable projecting ribs.

In order to ensure that the friction fit is sufficient to couple the frame member to the corner bracket, each locating arm may include a first outwardly projecting deformable rib carried by a first surface and a second outwardly projecting deformable rib carried by a second surface. In this way, each locating arm includes two projecting ribs, which effectively doubles the frictional forces exerted by each locating arm upon a respective frame member. In an embodiment of the invention, the first surface defines a plane that is perpendicular to a plane defined by the second surface. The surfaces of the locating arms that carry the projecting ribs are suitably the surfaces that are adjacent to walls of respective frame members in use. Thus, the structure of the frame members may determine which surfaces of the locating arms carry the projecting deformable ribs.

The projecting ribs may deform plastically (i.e. the rib does not recover from the deformation) or the projecting ribs may be resiliently deformable (i.e. they are able to recover at least partially following deformation).

According to a second aspect of the invention, there is provided a window blind frame comprising a pair of angled frame members having adjacent ends which are joined together by a corner bracket as defined anywhere hereinabove, wherein each frame member includes a body portion which defines a first channel and a second channel; the friction plate of each connector of the corner bracket forms a friction fit within the first channel; and the locating arm of each corner bracket connector is located within the second channel defined by each frame member.

In embodiments in which the locating arms each include at least one further deformable projecting rib, the locating arm of each connector may form a friction fit within the respective second channel.

The angle between the pair of frame members may be as defined and described above.

The frame of the second aspect of the invention may comprise three frame members which together form a closed triangular frame in which each end of the frame members is connected to an adjacent end of another frame member, or which together form an open rectangular frame in which one side of the rectangle is open (i.e. includes no frame member) and two of the frame members include a corner element only at one end thereof.

Alternatively, the frame may comprise four frame members which together form a closed rectangular frame in which each end of the frame members is connected to an adjacent end of another frame member.

The skilled person will appreciate that frames having more than four sides are within the scope of the invention as defined herein, for example, it is known to provide 5-membered and six-membered frames (i.e. frames having 5 sides or 6 sides). Thus, the frames of the present invention may include 3, 4, 5, 6, 7 or 8 sides, for example. However, as windows tend to be rectangular or triangular (for example in conservatory roofs), the corresponding frames tend to be triangular or rectangular.

According to a third aspect of the invention, there is provided a combination of a window blind and a window blind frame as defined in the second aspect of the invention, wherein the window blind is secured to the window blind frame.

The window blind of the third aspect of the invention may be a roller blind, a vertical blind, a Venetian blind, a Roman blind, a cellular blind or a pleated blind.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

An embodiment of the invention will now be described, by way of example only, with reference to the accompanying drawings in which.

DETAILED DESCRIPTION OF THE PREFERRED EMBODIMENTS

For the avoidance of doubt, the skilled person will appreciate that in this specification, the terms “up”, “down”, “front”, “rear”, “upper”, “lower”, “width”, etc. refer to the orientation of the components as found in the example when installed for normal use as shown in the Figures.

Figure 1A:
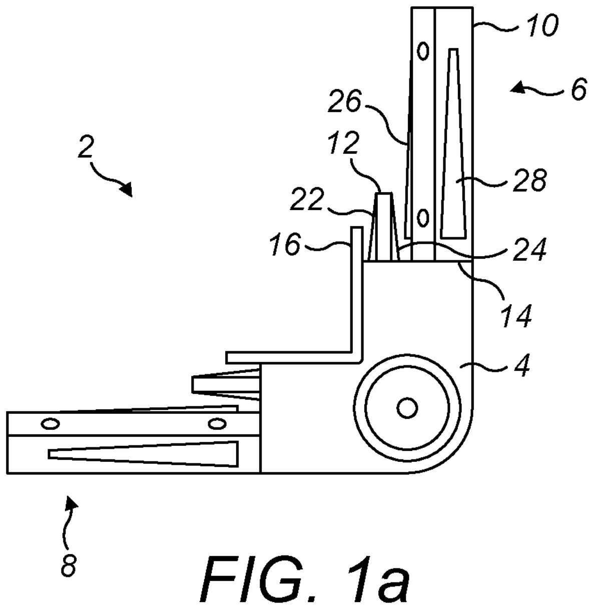
FIGS. 1*a*, 1*b* and 1*c* are views from different angles of a corner bracket according to a first embodiment of the invention.
Figure 1B:
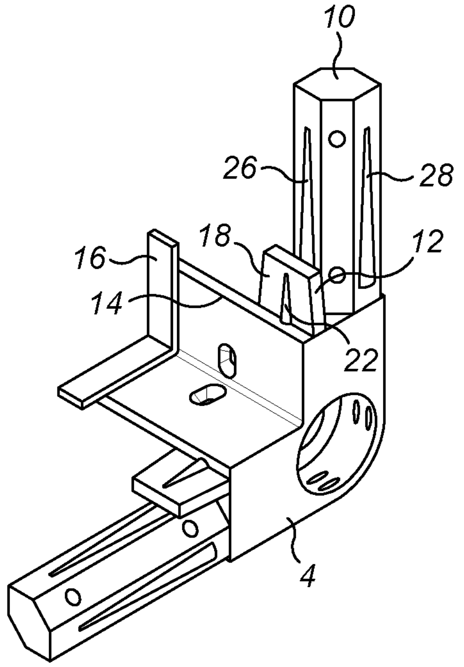
Figure 1C:
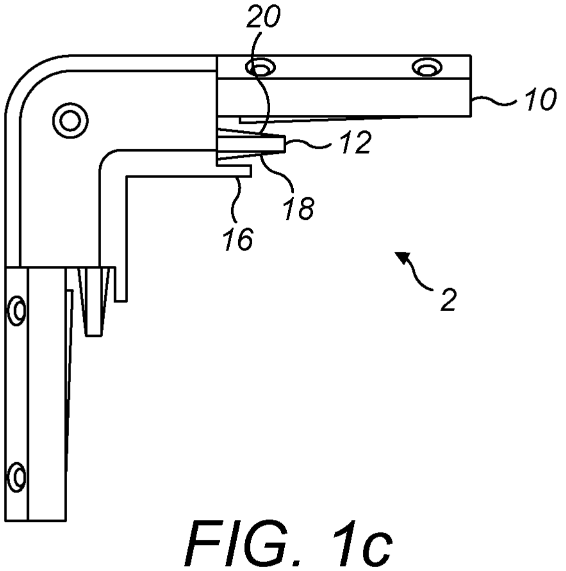

FIGS. 1*a*, 1*b* and 1*c* show a corner bracket 2 for a window blind frame. The corner bracket 2 comprises a central body portion 4 and extending perpendicularly from the central body portion 4 a first connector 6 and a second connector 8. The corner bracket 2 is formed from an injection moulded polymeric material.

Each of the connectors 6, 8 include a locating arm 10, a friction plate 12, a stop surface 14 and a locating tab 16. Each friction plate 12 defines an internal surface 18 and an external surface 20. The internal surface 18 carries a tapered deformable projecting rib 22, and the external surface 20 carries a tapered deformable projecting rib 24.

As can be seen from FIGS. 1*a* and 1*c*, the locating arm 10 is spaced from the external surface 20 of each friction plate 12 such that a first gap is defined between them. Additionally, the locating tab 16 is spaced from the internal surface 18 of each friction plate 12 such that a second gap is defined between them.

In addition to the tapered deformable projecting ribs 22, 24 provided on the friction plate 12, each of the locating arms 10 also carries two further tapered deformable projecting ribs 26, 28.

As can be seen from FIGS. 1*a* and 1*c*, the further deformable projecting rib 26 faces the external projecting rib 24 and both the projecting ribs 24 and 26 are located within the first gap defined between the locating arm 10 and the external surface 20 of the friction plate 12.

Figure 2B:
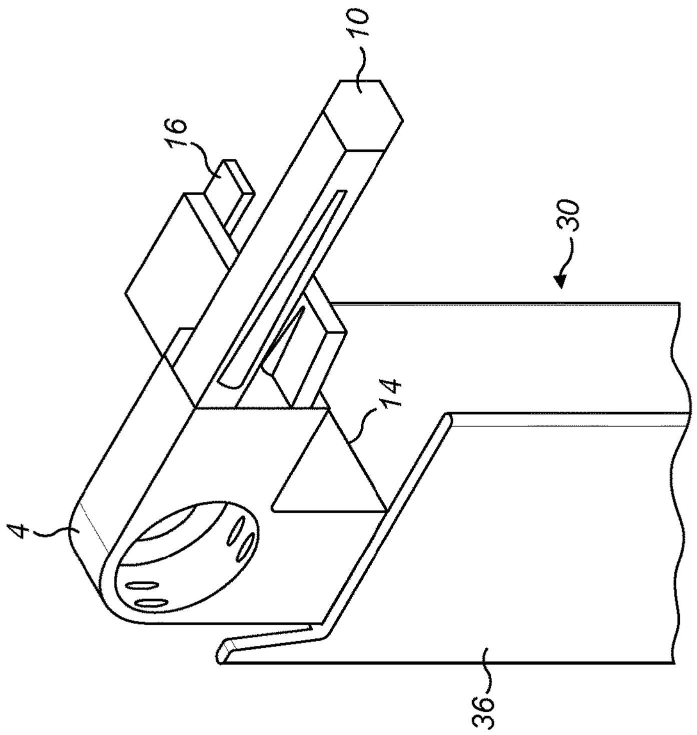
FIG. 2*b* shows the corner bracket of FIG. 2*a* inserted into the frame member.
Figure 2A:
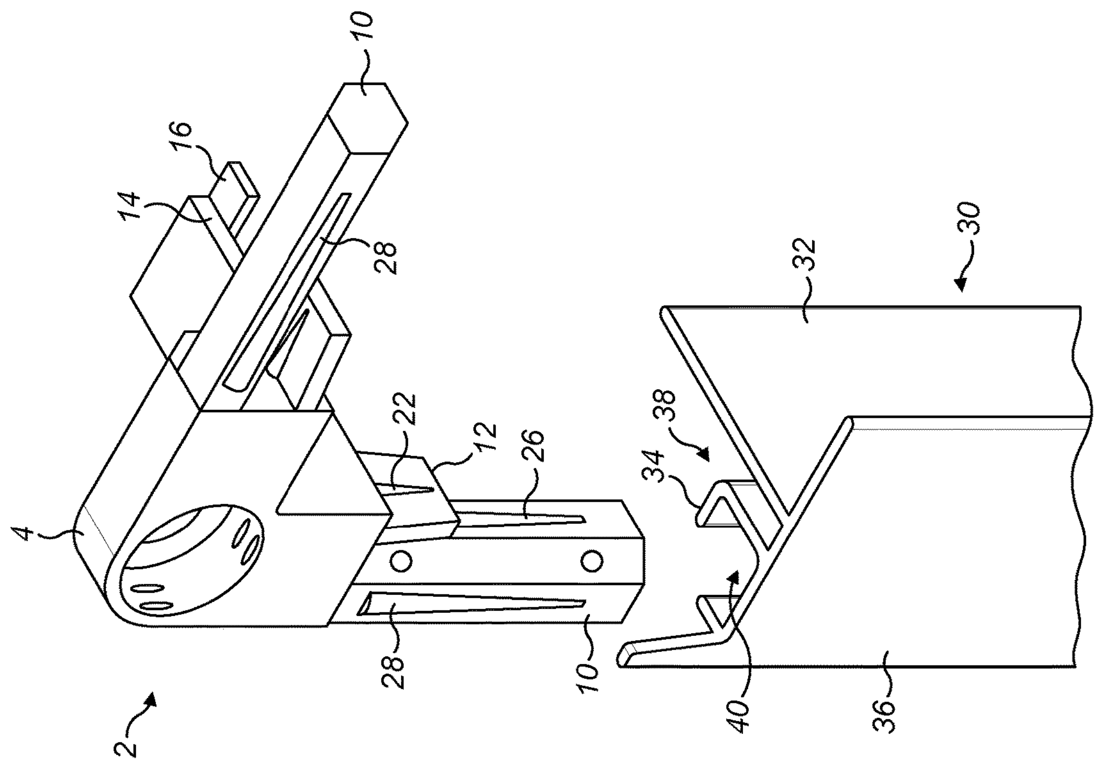
FIG. 2*a* shows a combination of a corner bracket according to the first embodiment of the invention and a frame member.

FIG. 2*a* shows a frame member 30 in the form of an elongate aluminium extrusion. The frame member 30 includes an internal wall 32, a channel defining portion 34 and an outer wall portion 36.

The internal wall 32 is sized and configured for location within the second gap defined between the internal surface 18 of the friction plate 12 and the locating tab 16.

A first longitudinal channel 38 is defined between the internal wall 32 and the channel defining portion 34.

The channel defining portion 34 defines a second longitudinal channel 40 which is sized and configured to receive therein a respective locating arm 10 of the corner bracket 2.

Figure 3:
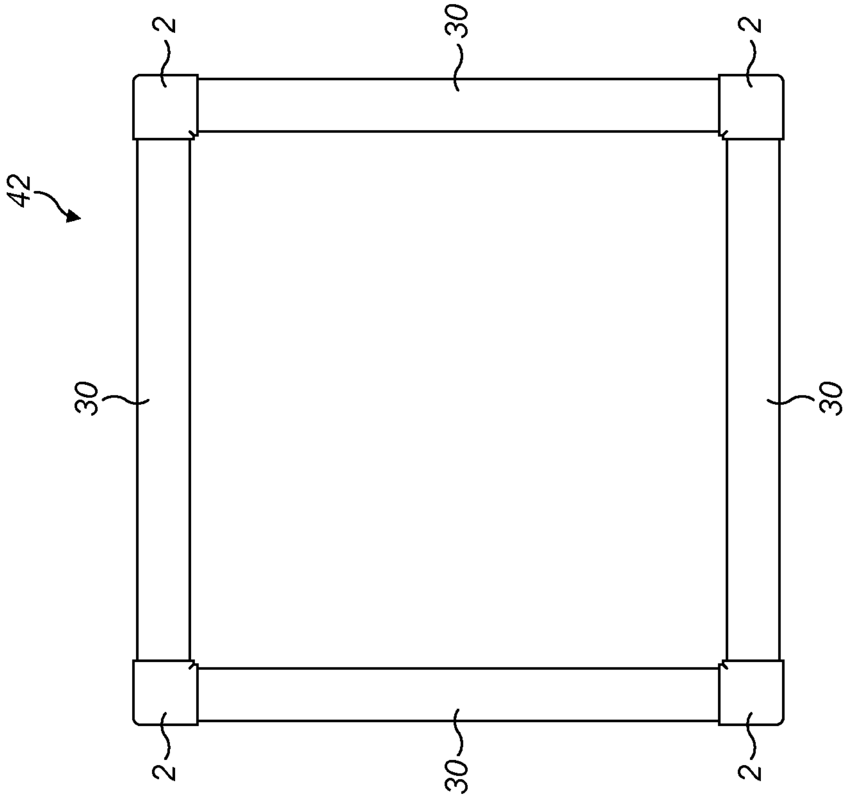
FIG. 3 shows a window blind frame in accordance with the second aspect of the invention.

To assemble a frame 42 (shown in FIG. 3), a first frame member 30 is located adjacent to a respective corner bracket 2 such that the locating arm 10 is located at the entrance to the second longitudinal channel 40 defined by the channel defining portion 34. The locating arm 10 is then urged into the second longitudinal channel 40. As the locating arm 10 is urged into second longitudinal channel 40, the projecting ribs 26, 28 carried by the locating arm 10 engage respective side walls which define the second longitudinal channel 40 and are deformed.

When the locating arm 10 is approximately 75% inserted into the second longitudinal channel 40, the friction plate 12 begins to enter the first longitudinal channel 38 defined between the internal wall 32 and the channel defining portion 34. The internal wall 32 engages the tapered deformable projecting rib 24 and the channel forming portion 34 engages the tapered deformable projecting rib 22.

As the corner bracket 2 is urged further into the first frame member 30, the projecting ribs 26, 28 continue to deform as describe above and the projecting ribs 22, 24 begin to deform.

When the stop surface 14 engages the end of the first frame element 30, both the locating arm 10 and the friction plate 12 are fully inserted into their respective channels 38, 40 and all of the deformable projecting ribs 22, 24, 26, 28 have been deformed such that a friction force is exerted between the corner bracket 2 and the first frame member 30 that is sufficient to retain the corner bracket 2 within the frame member 30. Thus, in the case of the embodiment described herein, the corner bracket 2 is coupled to the frame member 30 via the frictional forces exerted by the four deformed ribs 22, 24, 26, 28.

The frame 42 is completed by repeating the above steps for each corner of the frame.

Figure 4:
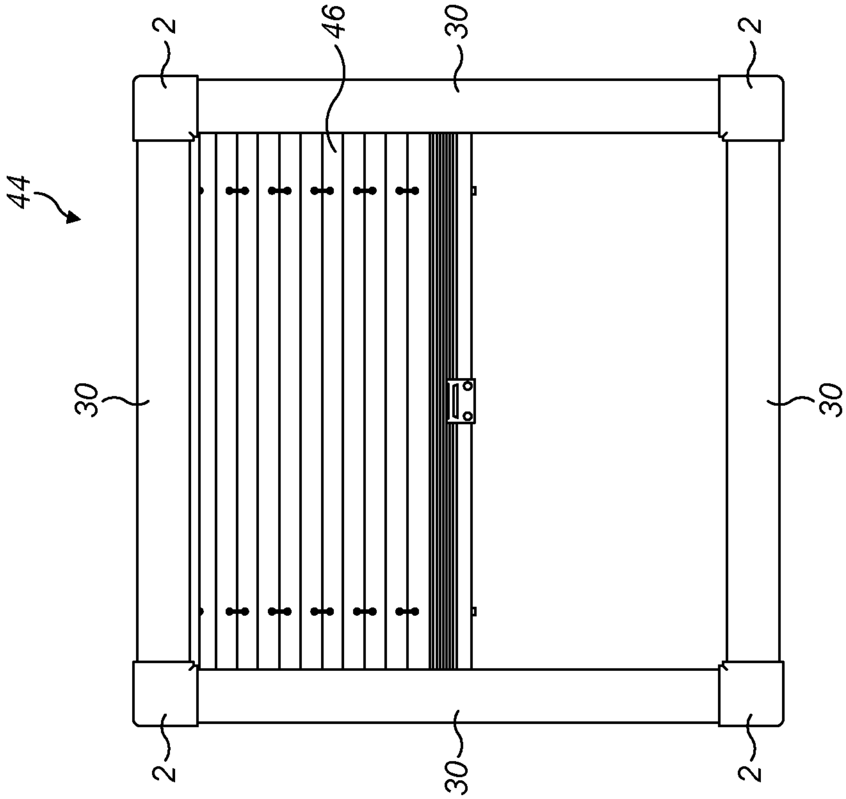
FIG. 4 shows a window blind in accordance with the third aspect of the invention.

FIG. 4 shows a window blind system 44 which comprises a completed frame 42 and secured thereto a pleated blind 46. The headrail (not shown) of the pleated blind 46 is secured to the top frame member 30 in any convenient way.

The window blind system 44 can then be secured to a window in accordance with the clips and method described in EP1727958.

The invention claimed is:

1. A corner bracket for a window blind frame, the corner bracket including a central body portion and extending from the central body portion a first connector and a second connector, wherein the second connector is angled relative to the first connector; each of the first and second connectors include a locating arm, a friction plate and a stop surface; wherein each of the friction plates defines a pair of opposed surfaces and each of the opposed surfaces of each of the friction plates carries thereon a respective outwardly projecting deformable rib; and wherein each of the locating arms further includes a first outwardly projecting deformable rib carried by a first surface of the respective locating arm and a second outwardly projecting deformable rib carried by a second surface of the respective locating arm; and wherein each of the friction plates is spaced from the respective locating arm to define a gap between the friction plate and the respective locating arm.

2. The corner bracket according to claim 1, wherein the angle between the first connector and the second connector is from 10° to 170°.

3. The corner bracket according to claim 1, wherein each of the stop surfaces includes a locating tab, wherein the locating tab is parallel to the respective friction plate and spaced therefrom.

4. The corner bracket according to claim 1, wherein the outwardly projecting deformable ribs extend substantially perpendicularly from the plane of the respective surfaces.

5. The corner bracket according to claim 1, wherein the outwardly projecting deformable ribs include a tapered portion at their leading edge.

6. The corner bracket according to claim 1, wherein the first surface defines a plane that is perpendicular to a plane defined by the second surface.

7. A window blind frame comprising a first and a second angled frame member each having adjacent ends which are joined together by a corner bracket, wherein the corner bracket includes a central body portion and extending from the central body portion a first connector and a second connector, wherein the second connector is angled relative to the first connector; each of the first and second connectors include a locating arm, a friction plate and a stop surface; wherein each of the friction plates defines a pair of opposed surfaces and each of the opposed surfaces carries thereon a respective outwardly projecting deformable rib; wherein each of the locating arms includes a first outwardly projecting deformable rib carried by a first surface; and wherein each of the friction plates is spaced from the respective locating arm to define a gap between the friction plate and the locating arm; and wherein each of the frame members includes a body portion which defines a first channel and a second channel; the friction plate of each of the corner bracket connectors forms a friction fit within the first channel via the deformation of the outwardly projecting ribs of the respective friction plate; and the locating arm of each of the corner bracket connectors is located within the respective second channels defined by each of the frame members.

8. The window blind frame according to claim 7, wherein each of the locating arms of the corner bracket includes a second outwardly projecting deformable rib, and the locating arms form a friction fit within the respective second channels of the pair of frame members via the deformation of the first and second outwardly projecting ribs within the second channel.

9. The window blind frame according to claim 7, wherein the frame includes a third frame member and an additional corner bracket, wherein adjacent ends of the frame members are joined together by respective ones of the corner brackets.

10. The window blind frame according to claim 7, wherein the frame comprises a third and a fourth frame member and additional corner brackets having a rectangular arrangement, wherein adjacent ends of the frame members are joined together by respective ones of the corner brackets.

11. A combination of a window blind and the window blind frame according to claim 7, wherein the window blind is secured to the window blind frame.

12. The combination according to claim 11, wherein the window blind is a roller blind, a vertical blind, a Venetian blind, a Roman blind, a cellular blind or a pleated blind.

* * * * *